Feb. 18, 1964 H. W. TREVASKIS 3,121,653
TYRE BUILDING MACHINES
Filed Aug. 7, 1961 7 Sheets-Sheet 7
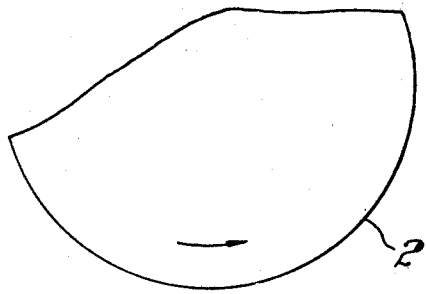
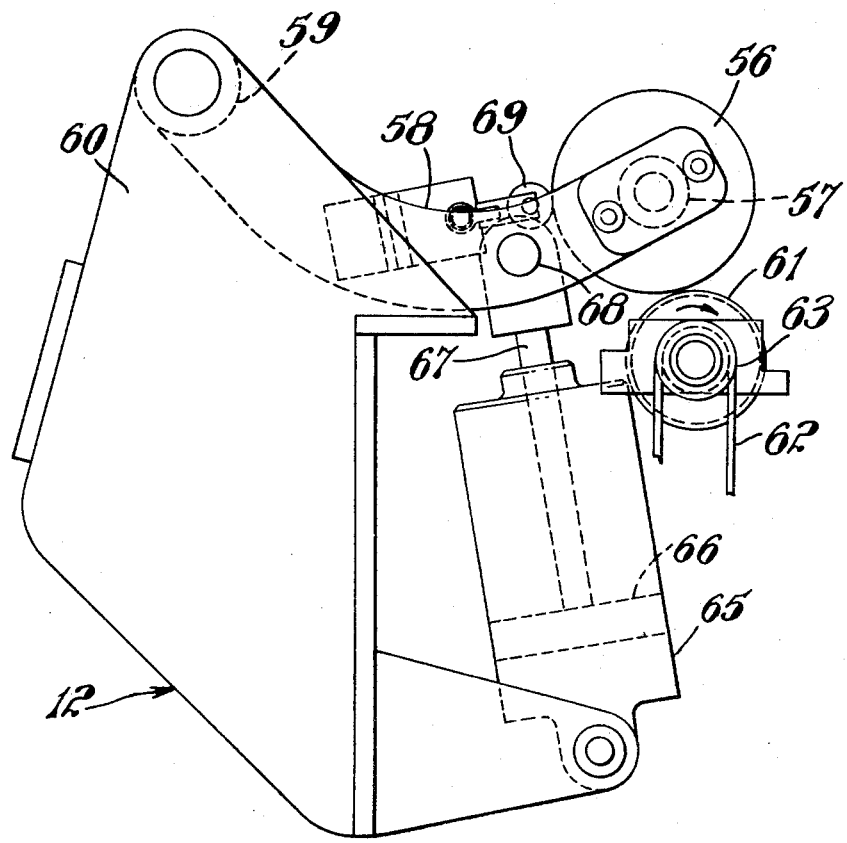
INVENTOR
Henry William Trevaskis
by Benj. T. Rauber
attorney 3,121,653
TYRE BUILDING MACHINES
Henry William Trevaskis, Blackdown, near Leamington Spa, England, assignor to Dunlop Rubber Company Limited, London, England, a British company
Filed Aug. 7, 1961, Ser. No. 129,666
Claims priority, application Great Britain Aug. 16, 1960
17 Claims. (Cl. 156—403)

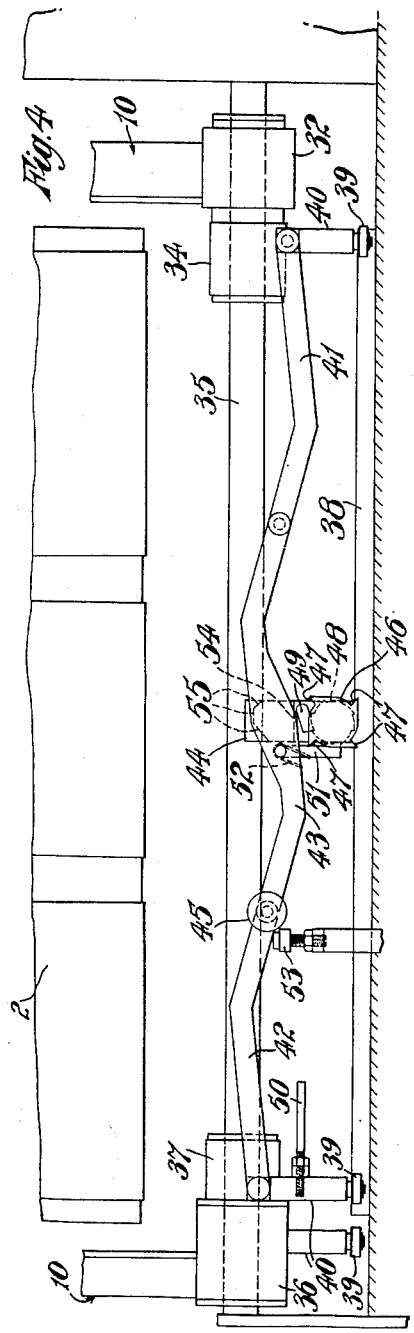

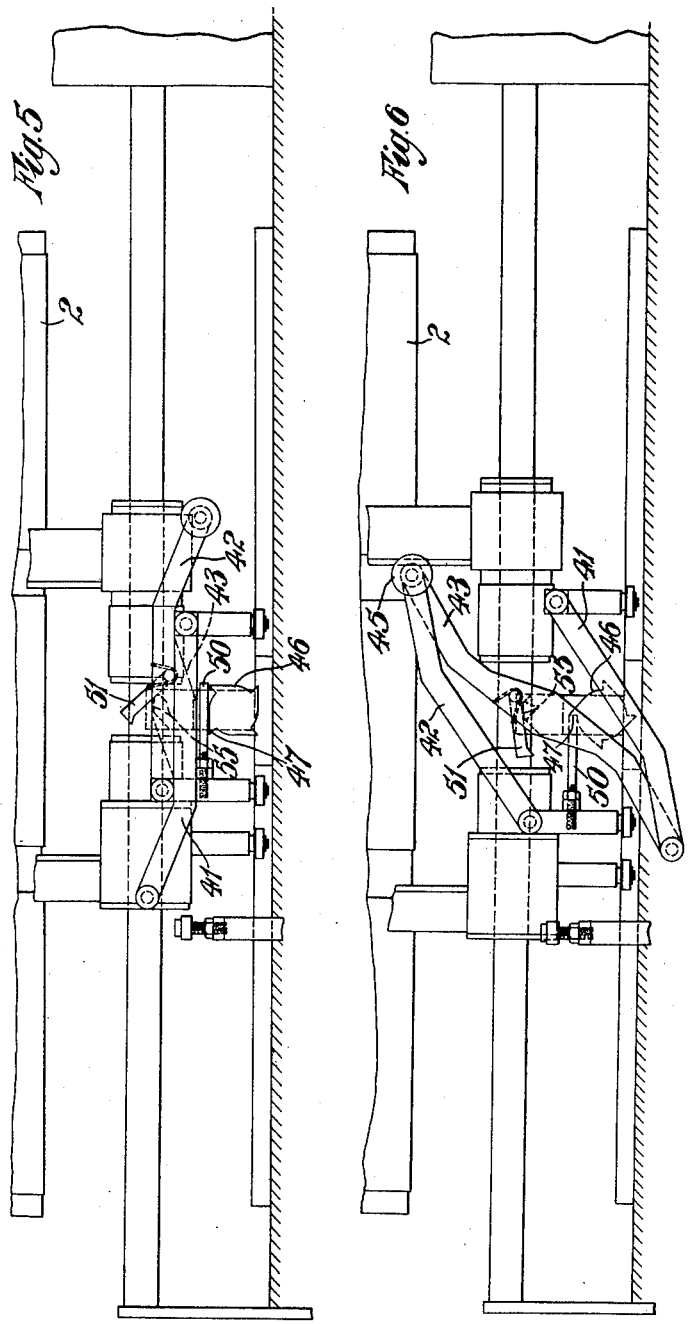

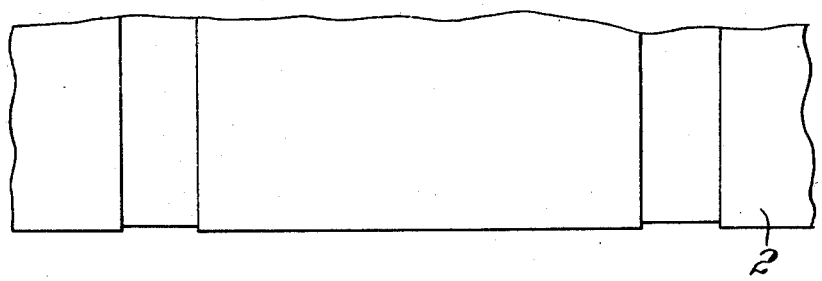
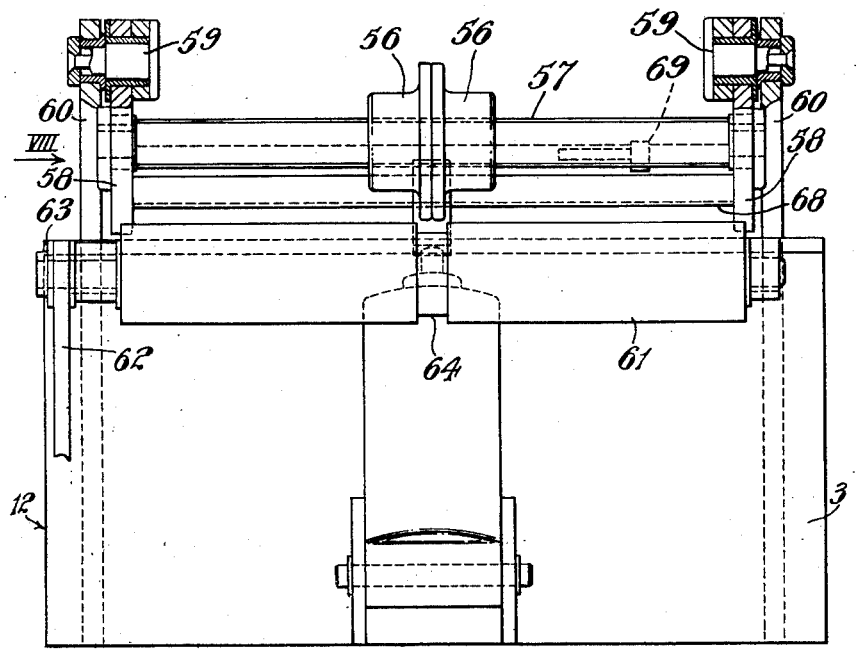
Fig. 7

This invention relates to tyre building machines incorporating centralising devices for locating bead wires coaxially with respect to a tyre building former and for applying them to a partially built tyre carcass already on the former.

According to the present invention a tyre building machine comprises a rotatable tyre building former, a pair of axially movable bead centralising members disposed one at each end of the former, each member having a supporting face for carrying a bead wire and a centralising device for moving the bead wire radially across the supporting face so as to position it coaxially with the former.

Preferably retaining means is provided in each centralising member for retaining a bead wire on the supporting face and this may comprise a magnet or a plurality of magnets disposed around the member in equally-spaced-apart positions.

Preferably also the centralising device comprises a plurality of radially inwardly extending centralising pins, disposed with their inner ends at equal distances from the axis of the former, means being provided for moving the pins radially inwardly together so that the distances between the ends of the pins and the former remain equal. The means for moving the pins radially inwards comprises a plurality of cam surfaces with which the pins are in engagement, one pin with each cam surface, by means of which the pins may be urged radially inwardly together to engage the outer peripheral surface of a bead wire and move the bead wire so as to position it coaxially with the former.

Means are also included in each centralising device for returning the pins radially outwardly to their original positions to release the bead when it is disposed and supported in its correct axial position around a tyre carcass being built upon the former. Preferably, these means are resilient spring means which may comprise a plurality of leaf springs, each spring being fitted to a centralising pin so as to resist its radially inward movement and return the pin as aforesaid.

One embodiment of the invention will now be described, by way of example, with reference to the accompanying drawings, in which:

FIGURES 4, 5 and 6 are views in side elevation showing three different positions of the centralising members and their operating linkage;

FIGURE 7 is a view in side elevation of a tread spinning assembly;

FIGURE 8 is a view in the direction of arrow VIII in FIGURE 7;

The tyre building machine will now be generally described.

Figure 1:
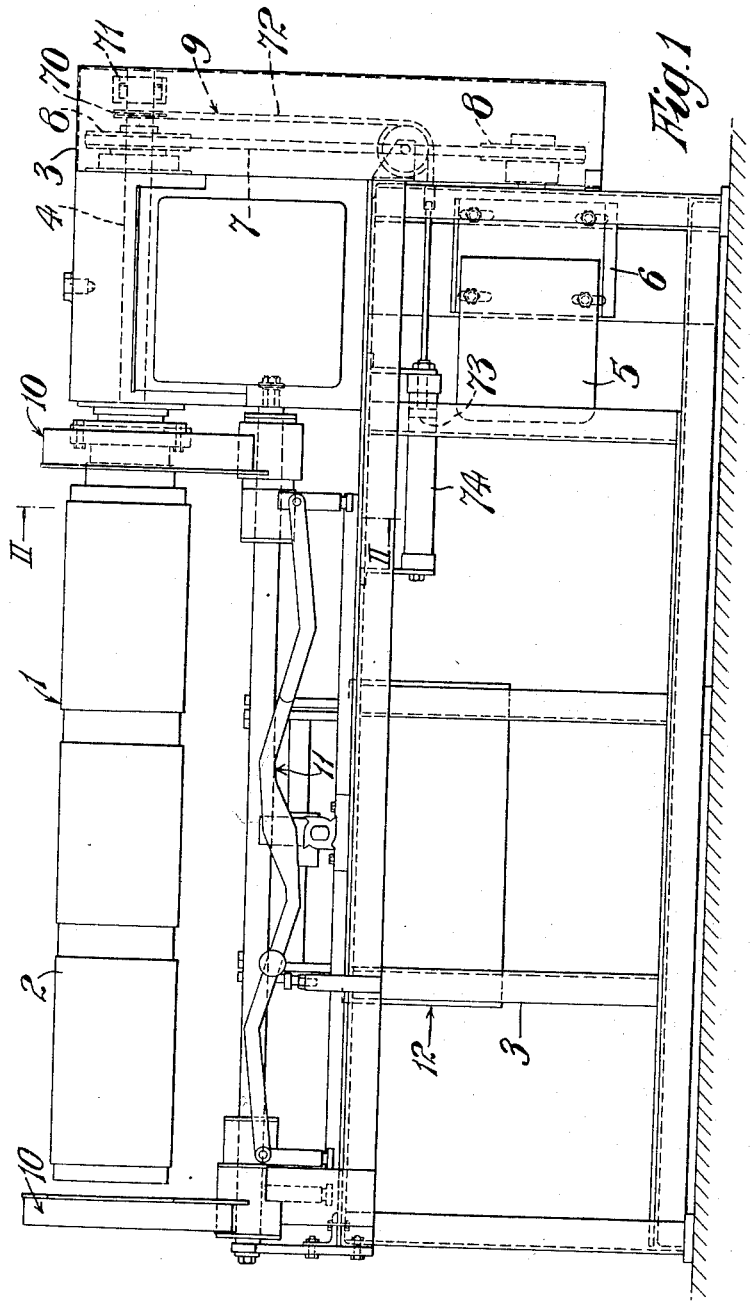
FIGURE 1 is a view in side elevation of a tyre building machine according to the invention, showing the main components of the machine but omitting details for clarity.

As shown in FIGURE 1, a tyre building machine 1, for the manufacture of small industrial tyres, comprises a high overlap tyre building former 2, horizontally and rotatably mounted in a framework 3, the former being of the form described in the specification of co-pending patent application of Wilfrid Lowe, Serial No. 731,419, filed April 28, 1958, now U.S. Patent No. 3,044,533. The driving shaft 4 of the former is drivably connected to an electric motor 5 and gear box 6 by means of an endless belt 7 and a pair of pulley wheels 8 mounted one on the driving shaft of the former and the other on the driven shaft of the gearbox. The former is also drivably connected to a means 9, separate from the motor 5, for rotating the former for a single complete revolution as will be described.

A pair of bead centralising members 10 are positioned coaxially and symmetrically with respect to the mid-circumferential plane of the former, one at each end of the former, and are movable axially symmetrically with respect to the said plane towards and away from one another by an operating linkage 11 as will be described.

A tread spinning assembly 12 is located in the framework 3 beneath the former 2.

The machine will now be more particularly described.

Figure 2:
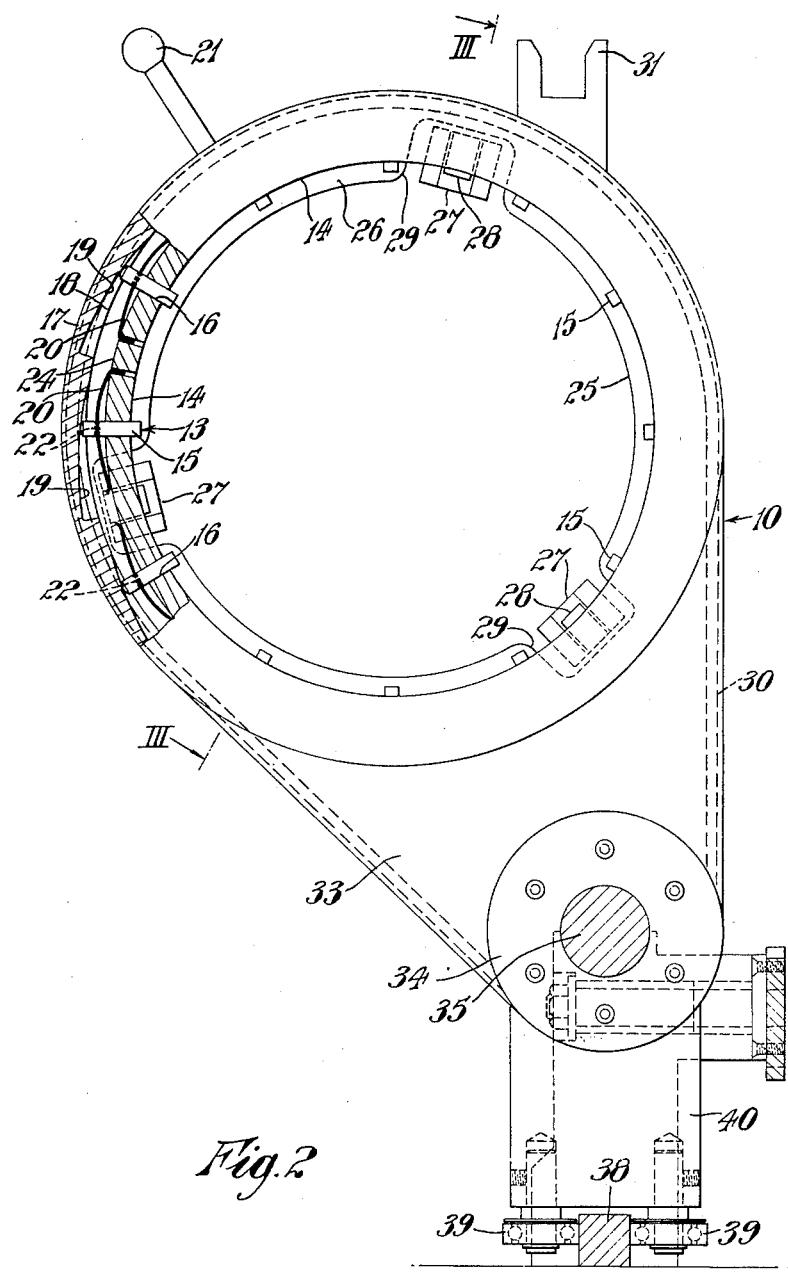
FIGURE 2 is a cross-sectional view on line II—II of the machine shown in FIGURE 1, showing one of a pair of bead centralising members, partly in cross-section.
Figure 3:
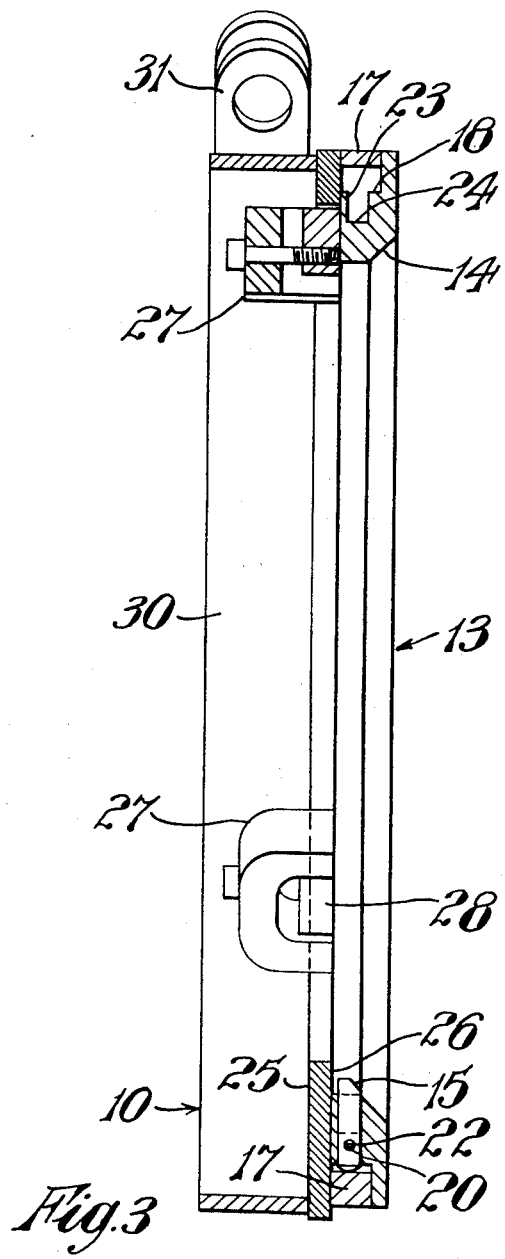
FIGURE 3 is a cross-sectional view on line III—III of the bead centralising member shown in FIGURE 2.

Each bead centralising member 10, as shown in FIGURES 2 and 3, comprises a centralising device 13. The centralising device 13 comprises an annular member 14, disposed coaxially with the former, and twelve bead centralising pins 15 disposed in equally spaced-apart positions around the member 14, the pins 15 being slidably mounted in bores 16 provided within the member so that the pins extend radially inwardly of the member with their ends disposed at equal distances from the axis of rotation of the former. Means for moving the pins radially inwardly comprises a cam ring 17 rotatably mounted upon an outer peripheral surface 18 of the member 14, the cam ring being provided with a handle 21 for manually rotating the ring and, on its inner periphery, with twelve similar cam surfaces 19 for engagement with the radially outer portions of the pins 15, one cam surface with each pin.

The cam surfaces are so shaped that upon rotation of the cam ring, in the appropriate direction relative to the centralising member 14, the centralising pins 15 are moved together towards the axis of the former, the pins being maintained at equal distances from the said axis as they are moved. Means are provided to return the pins to their radially outermost positions and hold the pins in engagement with the cam surfaces 19. This means comprises twelve leaf springs 20 secured, one to each pin, through transverse bores 22 provided in the pins, the springs being received within an annular recess 23 in the member 14, each spring being secured at one end to the member 14, the other end of the spring lying in abutting contact with the inner peripheral surface 24 of the recess 23.

An annular plate 25 is secured to the annular member 14 on the side of the member remote from the former 2. The plate 25 projects radially inwardly of the member 14 so that a supporting face 26 for a bead wire is provided on the plate.

Means for retaining a bead wire upon the supporting face 26 is provided on each centralising member 10. This means comprises three U-shaped magnets 27 secured in equally spaced-apart positions to blocks 28 which are mounted upon the annular member 14, the magnets being received in radially extending recesses 29 provided in the inner periphery of the plate 25 so that the axially inner edges of the magnets and the supporting face 26 are axially in alignment. When a steel bead wire is placed within a member 10 so as to be carried on the supporting face 26, it is held on the face by the magnets which allow it to slide radially with respect to the axis of the former over the supporting face and the magnets.

A bracket 31 projects radially outwardly from an axially extending member 30 provided on the side of each bead centralising member 10 remote from the former 2. The brackets 31 of the members 10 have mounted thereon a tread centralising device of known type and a heavy rubber roller for pressing a tread strip onto a carcass positioned around the former, the device and roller not being illustrated.

As shown in FIGURES 4, 5 and 6 of the drawings, the centralising member 10 positioned on the right-hand side of the former is secured to an axially extending cylindrical member 32 by means of the member 30 (see FIGURE 2) and a radially outward extension 33 of the annular plate 25. The cylindrical member 32 is secured to a sleeve 34 which is slidably mounted on a cylindrical shaft 35 extending axially of the former and mounted at its ends to the framework 3. The centralising member 10 disposed at the other end of the former (see FIGURE 4) is similarly secured to a cylindrical member 36 which is rotatably mounted upon a sleeve 37, slidably mounted upon the same shaft 35. The centralising members 10 are axially slidable towards and away from the mid-circumferential plane of the former.

A guide rail 38 is secured to the framework 3 and extends axially of the former beneath the shaft 25, three pairs of rollers 39 being provided for engagement with the guide rail, the rollers being rotatably mounted at the lower end of three vertical blocks 40 extending towards the guide rail, one from each of the sleeves 34 and 37 and one from the cylindrical member 36, with the rollers of each pair being disposed one on each side of the guide rail. By this means, the centralising members are maintained in coaxial relationship with the former during axial movement of the members. In the position of the centralising members shown in FIGURE 4, the rollers 39 of the member 36 are in a position axially out of engagement with the guide rail 38 so that the member 36 and associated centralising member 10 may be rotated about the axis of the shaft 35 and out of axial alignment with the former to allow a tyre carcass to be removed axially from the former.

The operating linkage 11 for moving the centralising members axially symmetrically towards and away from one another comprises an over-centre type lever mechanism formed by two side levers 41 and 42 pivotally mounted, each by one of its ends, one lever at each end of a central lever 43. The lever 43 is itself pivotally mounted midway between its ends on a bracket 44 in a position axially offset from the mid-circumferential plane of the former, and the bracket 44 is secured between the framework 3 and the shaft 35. The side levers 41 and 42 are rotatably mounted at their other ends on the brackets 40 which are mounted, one on each of the sleeves 34 and 37. A handle 45, for manually operating the linkage, is rotatably mounted on the end of the lever 43 connected to the lever 42. The levers 41 and 42 are so shaped that during rotation of lever 43 in a clockwise direction to move the centralising members 10 axially towards one another, upon the centralising members reaching positions in which bead wires carried by the centralising members are accurately located with respect to the mid-circumferential plane of the former for disposing the bead wires upon a carcass being built on the former, the levers 41 and 42 come into abutting engagement and prevent further axial inward movement of the centralising members. This position is shown in FIGURE 5. The levers 41 and 42, therefore, provide a limiting means at a predetermined position of the centralising members for positioning bead wires upon the former.

The machine is also provided with a second limiting means for limiting axial inward movement of the centralising members when the members are a predetermined distance apart for attaching the tread centralising device between the brackets 31. The second limiting means comprises a toothed wheel 46 rotatably mounted on the bracket 44, with its axis of rotation parallel to but offset from that of the lever 43. The wheel 46 is provided with four radially inwardly extending abutment faces 47 disposed in equally spaced-apart positions around its periphery. Rotation of the wheel 46 may only be made in one direction, rotation in the other direction, by an object exerting a force directly on one of the abutment faces, being prevented by a ratchet 48 which is provided with eight teeth and is coaxially secured to the wheel so as to rotate with it, and a detent 49, pivotally mounted by one end to the bracket 44 and in engagement at its other end with the teeth of the ratchet.

An abutment member 50 attached to the block 40 secured to the sleeve 37, extends alongside the former towards the wheel 46. The abutment member is positioned so that its axially inner end comes into abutting contact with an abutment face of the wheel 46 when the wheel is rotated to a suitable position as will now be described. A pawl 51 is pivotally mounted by one end to the lever 43, in a position slightly removed from the intermediate pivot of that lever, a coil spring 52 being positioned on the mounting of the pawl to pivotally move the pawl towards the ratchet 48. When the centralising members are moved symmetrically away from one another by rotating lever 43 in an anti-clockwise direction, the pawl is rotated around the pivot of lever 43 and the other end of the pawl is moved into engagement with, and held in engagement with, one of the teeth of the ratchet 48 by means of the spring. Upon continued rotation of the lever 43, therefore, the ratchet 48, and thus the rotatable wheel 46, is rotated for an eighth of a revolution by the pawl 51 in an anti-clockwise direction, rotation of the wheel terminating when lever 42 moves into engagement with a stop bolt 53 secured to the framework 3. Upon alternate movements of the centralising members away from one another, therefore, the wheel 46 is disposed with one of the abutment faces 47 positioned vertically upwardly so that the abutment member 50 will come into abutting contact with the said face, upon the next inward movement of the centralising members, to stop the inward movement of the members in a position for attaching the tread centralising device between the members. This position is shown in FIGURE 6. During the other outward movements of the centralising members, however, the wheel 46 is rotated so that none of the abutment faces are moved into such a position, and, upon the succeeding inward movement of the centralising members, the abutment member 50 will not come into contact with an abutment face, the inward movement continuing until the members are brought to a stationary position by engagement of the levers 41 and 42. In this inward position the bead wires are accurately located as has been described. A block 54, having lifting faces 55, serves to raise the pawl 51 during axial inward movement of the centralising members and thus prevents the pawl from fouling the detent 49.

The tread spinning assembly 12 as shown in FIGURES 7 and 8 comprises a pair of tread spinners 56 threaded one on to each end of a screw-threaded shaft 57 positioned parallel to the axis of the former and secured by its ends to two arms 58. The arms 58 are pivotally mounted at their other ends by pins 59 to brackets 60 secured to the framework 3 for moving the spinners radially towards and away from the former as will be described. The shaft 57 is screw-threaded, half right-hand and half left-hand so that the spinners 56, which are retained normally in the centre of the shaft as shown in FIGURE 7, are rotated during a spinning operation in a clockwise direction by virtue of their contact with a tread strip wrapped around the former 2 rotating in an anticlockwise direction, as shown by the arrow in FIGURE 8, which moves the spinners apart towards the ends of the shaft 57.

A roller 61, for returning the spinners to the centre of the shaft 57, as will be described, is disposed beneath the shaft 57 and extends parallel to it, the roller being continuously driven in a clockwise direction as shown by the arrow in FIGURE 8, by a continuously moving endless pulley belt 62, wrapped around a pulley 63, secured to one end of the roller 61. The roller 61 is provided with an annular central groove 64. A double-acting pneumatic cylinder 65 and piston 66 for moving the spinners towards and away from the former is pivotally mounted by the lower end of the cylinder to the framework 3 and at the other end by the piston rod 67 to a shaft 68 extending between the arms 58.

To commence a tread spinning operation, the operator of the machine pushes a starter button to energise the motor 5 to rotate the former 2 and also to operate air valves (not shown) to reduce the air pressure in the upper part of the cylinder 65 and increase the air pressure in the lower part of the cylinder. The piston 66 is thus moved up the cylinder and moves the spinners 56 into engagement with a tread strip positioned on the former. The spinners are moved axially outwardly towards the ends of the shaft 57 during the spinning operation. Upon the spinners reaching the axially outermost ends of the tread strip a limit-switch 69 is operated by contact with one of the spinners to de-energise the motor 5 and so stop the rotation of the former, and also to operate the air valves to move the piston 66 down the cylinder 65 and so move the spinners away from the former into engagement with the roller 61. By virtue of their contact with the roller 61, the spinners are moved axially inwardly of the former, and in their inermost positions reach the groove 64 and out of contact with the roller. The spinners are then in the initial positions as shown in FIGURES 7 and 8.

The means 9 for rotating the former for a single complete revolution comprises a sprocket 70 (see FIGURE 1) which is coaxially mounted upon a free-wheel mechanism 71 secured to the end of the driving shaft 4 so that the free-wheel mechanism allows for rotation of the former in the direction it is driven by the electric motor without rotation of the sprocket. A chain 72 passing around the sprocket is connected at one end to the piston 73 of a pneumatic cylinder 74, movement of the piston along the cylinder hauling upon the chain to cause the former to rotate one revolution. A weight (not shown) is attached to the other end of the chain 72 and when air pressure is removed from the air cylinder, the weight exerts a pull on the chain to rotate the sprocket in the free-wheel direction, thus returning the piston and chain to their initial positions and leaving the drum in a stationary position.

The operation of the tyre building machine will now be described.

Initially the machine is stationary with the bead centralising members 10 in their axially outermost positions as shown in FIGURE 1. A pre-assembled high overlap ply assembly (not shown), in strip form, comprising one ply on which is positioned a breaker strip and two chafer strips, is fed from a servicing machine onto the former, which is rotated for one revolution by the means 9 described above.

A bead wire is placed in each centralising member radially within the centralising pins 15 which are in their radially outermost positions, and resting upon the supporting face 26, the magnets 27 holding the bead wire within the member whilst the centralising pins are moved radially inwardly in the manner previously described, in respect of each member, to slide the bead wire on the face 26 and position it coaxially with respect to the former.

The lever 43 of the mechanism 11 is rotated about its pivot to move the bead centralising members symmetrically towards each other over the former, the toothed wheel 46 being positioned as has already been described to allow the members 10 to move into their axially innermost positions, as shown in FIGURE 5, to accurately locate the bead wires with respect to the mid-circumferential plane of the former. The former is then expanded in the manner described in the specification of the above mentioned co-pending patent application Serial No. 731,419 to grip the bead wires, and the centralising members are axially removed by rotating the central levers in the other direction. During this axially outward movement of the centralising members, the rotatable wheel 46 is rotated for one eighth of a revolution by means of the lever 51 and ratchet 48 to move an abutment face 47 into a vertical position.

The sides of the ply assembly are then turned over the bead wires in the manner described in the specification of the above mentioned co-pending patent application Serial No. 731,419.

The bead centralising members are again moved symmetrically towards each other over the former, the abutment member 50 coming into contact with the vertical abutment face 47 so that movement of the members 10 terminates when they are in the positions shown in FIGURE 6. The tread centralising device is then positioned between them.

A tread strip is fed through this device onto the partly built tyre carcass, the former being rotated for a single complete revolution by the means 9. The tread centralising device is removed and the bead centralising members are withdrawn, the rotatable wheel 46 being rotated as before to allow the members 10 during their next axially inward movement to terminate in the position shown in FIGURE 5. The tread spinners 56 are then moved into contact with the tread strip on the former to complete a tread spinning operation and consolidate the tread strip upon the turned-over ply on the former. At the end of this operation, rotation of the former is automatically stopped and the spinners are returned to their initial positions as has been described.

The carcass of the tyre in its substantially cylindrical shape may now be removed from the former.

Having now described my invention, what I claim is:

1. A tyre building machine comprising a rotatable tyre building former, a pair of axially movable bead centralising members disposed one at each end of the former, each member having a supporting face normal to the axis of the former for carrying a bead wire and a radially adjustable centralising device for moving the bead wire radially across the supporting face so as to position it coaxially with the former.

2. A machine according to claim 1 wherein a bead wire retaining means is provided in each bead centralising member for slidably retaining a bead wire on the supporting face of the said member.

3. A machine according to claim 2 wherein the retaining means comprises at least one magnet disposed around the bead centralising member in spaced-apart positions.

4. A machine according to claim 1 wherein each centralising device comprises a plurality of radially inwardly extending centralising pins disposed with their inner ends at equal distances from the axis of the former, means being provided for moving the pins radially inwardly together with respect to the axis of the former so that the distances between the ends of the pins and the axis of the former remain equal during movement of the pins.

5. A machine according to claim 4 wherein the means for moving the centralising pins radially inwardly comprises a plurality of cam surfaces, one in engagement with each pin, the cam surfaces being movable together in relation to the centralising pins.

6. A machine according to claim 5 wherein a cam ring is provided on each centralising member, the cam ring having the cam surfaces formed around its inner periphery and being rotatably mounted upon its associated centralising member and positioned radially outwardly of the centralising pins.

7. A machine according to claim 4 wherein means are provided for moving the pins radially outwardly with respect to the axis of the former.

8. A machine according to claim 7 wherein the means for moving the pins radially outwardly comprises springs.

9. A machine according to claim 8 wherein the springs comprise a plurality of leaf springs, one for each pin, each spring being disposed with its ends at fixed radial distances from the axis of the former and being secured intermediate its ends to its associated pin so as to resist the radially inward movement of the pin.

10. A machine according to claim 1 wherein limiting means are provided to stop axial inward movement of each centralising member at a predetermined position in which bead wires are accurately located symmetrically one on each side of the mid-circumferential plane of the former.

11. A machine according to claim 10 comprising a tread centralizing device, bead centralising members being provided with means for attaching said tread centralising device between the members, a second limiting means operable alternately with the first limiting means to stop axial inward movement of the centralising members in a position for attaching the tread centralising device between the members.

12. A machine according to claim 11 wherein means are provided for moving simultaneously the centralising members axially towards and away from one another symmetrically with respect to the mid-circumferential plane of the former.

13. A machine according to claim 12 wherein the said means for moving the centralising members comprises a lever mechanism pivotally mounted intermediate its ends about an axis which is fixed relative to the mid-circumferential plane and means pivotally connecting said lever at its ends to the centralising members, one end to each member.

14. A machine according to claim 13 wherein the second limiting means comprises an abutment member secured to one of the bead centralising members to extend axially between the members and a wheel rotatably mounted about an axis which is fixed relative to the mid-circumferential plane of the former, the wheel having abutment faces for engagement with the abutment member and being actuable to rotate from one predetermined position to another upon axial movement of the centralising members so that the abutment member engages an abutment face only upon alternate axially inward movements of the said members.

15. A machine according to claim 1 comprising means for rotating the former for a single complete revolution during the application of tyre building material to the former.

16. A machine according to claim 15 in which the said means for rotating the former comprises a sprocket coaxially mounted to the driving shaft of the former freely rotatable upon it in one direction and drivably rotatable to rotate it in the other, and a chain passing around the sprocket, a pneumatic cylinder and a piston slidable in said cylinder and attached to one end of the chain to move the chain around the sprocket to drive the shaft, and the chain having attached to its other end means for returning the chain, piston and sprocket to their original positions without rotation of the shaft.

17. A machine according to claim 1 wherein a plurality of tread spinners are provided, means to move said spinners automatically from axially inner positions axially outwardly towards the ends of the former during a tread spinning operation and means to return said spinners automatically to their axially inner positions.

References Cited in the file of this patent
UNITED STATES PATENTS

| | | |
|---|---|---|
| 1,339,451 | Goff | May 11, 1920 |
| 1,923,062 | Bearman | Aug. 22, 1933 |
| 1,966,541 | Denmire | July 17, 1934 |
| 2,608,497 | Breth | Aug. 26, 1952 |
| 2,642,921 | Appleby | June 23, 1953 |